United States Patent
Rendle et al.

(10) Patent No.: US 10,482,392 B2
(45) Date of Patent: Nov. 19, 2019

(54) ROBUST LARGE-SCALE MACHINE LEARNING IN THE CLOUD

(71) Applicant: Google Inc., Mountain View, CA (US)

(72) Inventors: Steffen Rendle, Mountain View, CA (US); Dennis Craig Fetterly, Belmont, CA (US); Eugene J. Shekita, San Jose, CA (US); Bor-yiing Su, Mountain View, CA (US)

(73) Assignee: Google LLC, Mountain View, CA (US)

( * ) Notice: Subject to any disclaimer, the term of this patent is extended or adjusted under 35 U.S.C. 154(b) by 306 days.

(21) Appl. No.: 15/429,216

(22) Filed: Feb. 10, 2017

(65) Prior Publication Data

US 2017/0236072 A1 Aug. 17, 2017

Related U.S. Application Data

(60) Provisional application No. 62/294,683, filed on Feb. 12, 2016.

(51) Int. Cl.
| | |
|---|---|
| *G06N 20/00* | (2019.01) |
| *G06F 3/06* | (2006.01) |
| *G06N 7/00* | (2006.01) |
| *G06F 9/46* | (2006.01) |

(52) U.S. Cl.
CPC ............. *G06N 20/00* (2019.01); *G06F 3/067* (2013.01); *G06F 3/0644* (2013.01); *G06F 3/0655* (2013.01); *G06F 9/46* (2013.01); *G06N 7/00* (2013.01)

(58) Field of Classification Search
None
See application file for complete search history.

(56) References Cited

U.S. PATENT DOCUMENTS

2006/0056525 A1* 3/2006 Jain ............... H04L 27/2628
375/260
2015/0324655 A1 11/2015 Chalasani et al.

FOREIGN PATENT DOCUMENTS

WO  WO 2015/183917  12/2015

OTHER PUBLICATIONS

Fercoq et al. "Accelerated, Parallel, and Proximal Coordinate Descent", Siam J. Optim, 2015, pp. 1997-2023.*
Bennett et al., "The Netflix Prize" Proceedings of KDD Cup and Workshop, Aug. 12, 2007, San Jose, California, 4 pages.
Blumofe et al., "Scheduling Multithreaded Computations by Work Stealing", Journal of the ACM, vol. 46, Issue 5, Sep. 1999, pp. 720-748.

(Continued)

*Primary Examiner* — Li Wu Chang
(74) *Attorney, Agent, or Firm* — Dority & Manning, P.A.

(57) ABSTRACT

The present disclosure provides a new scalable coordinate descent (SCD) algorithm and associated system for generalized linear models whose convergence behavior is always the same, regardless of how much SCD is scaled out and regardless of the computing environment. This makes SCD highly robust and enables it to scale to massive datasets on low-cost commodity servers. According to one aspect, by using a natural partitioning of parameters into blocks, updates can be performed in parallel a block at a time without compromising convergence. Experimental results on a real advertising dataset are used to demonstrate SCD's cost effectiveness and scalability.

15 Claims, 7 Drawing Sheets

(56) References Cited

OTHER PUBLICATIONS

Bottou, "Stochastic Learning", Advanced Lectures on Machine Learning, vol. 3176 of Lectures Notes in Computer Science, pp. 146-168.

Bradley et al., "Parallel Coordinate Descent for L1-Regularized Loss Minimization", 28th International Conference on Machine Learning, Jun. 28-Jul. 2, 2011, Bellevue, Washington, 8 pages.

Canny et al., "Big Data Analytics with Small Footprint: Squaring the Cloud", 19th ACM SIGKDD International Conference on Knowledge Discovery and Data Mining, Aug. 11-14, 2013, Chicago, Illinois, pp. 95-103.

Chandra, "Sibyl: A System for Large Scale Machine Learning at Google", Keynote talk at the 44th Annual IEEE/IFIP International Conference on Dependable Systems and Networks, 2014, 1 page.

Chang et al., "Coordinate Descent Method for Large-Scale L2-Loss Linear Support Vector Machines", Journal of Machine Learning Research, vol. 9, Jun. 2008, pp. 1369-1398.

Chapelle et al., "Simple and Scalable Response Prediction for Display Advertising", ACM Transactions on Intelligent Systems and Technology, vol. 5, No. 4, Dec. 2014, pp. 61:1-61:34.

Chen et al., "Understanding TCP Incast and Its Implications for Big Data Workloads", Technical Report No. UCB/EECS-2012-40, Apr. 6, 2012, 10 pages.

Collins et al., "Logic Regression, AdaBoost and Bregman Distances", Machine Learning, vol. 48, Issue 1, Jul. 2002, pp. 253-285.

Dean et al., "The Tail at Scale" Communications of the ACM, vol. 56, Issue 2, Feb. 2013, pp. 74-80.

Dean et al., "Large Scale Distributed Deep Networks", 25th International Conference on Neural Information Processing Systems, Dec. 3-6, 2012, Lake Tahoe, Nevada, pp. 1223-1231.

Dean et al., MapReduce: Simplified Data Processing on Large Clusters, Communications of the ACM, vol. 51, Issue 1, Jan. 2008, pp. 107-113.

Friedman et al., "Regularization Paths for Generalized Linear Models via Coordinate Descent", Journal of Statistical Software, vol. 33, Issue 1, Aug. 30, 2010, pp. 1-22.

Ghemawat et al., "The Google File System" 19th ACM Symposium on Operating Systems Principals, Bolton Landing, New York, Oct. 19-22, 2003, pp. 29-43.

Graepel et al., "Web-Scale Bayesian Click-Through Rate Prediction for Sponsored Search Advertising in Microsoft's Bing Search Engine", 27th International Conference on Machine Learning, Haifa, Israel, Jun. 21-24, 2010, pp. 13-20.

He et al., "Practical Lessons from Predicting Clicks on Ads at Facebook", 8th International Workshop on Data Mining for Online Advertising, Aug. 24-27, 2014, New York, New York, pp. 5:1-5:9.

Li et al., "Scaling Distributed Machine Learning with the Parameter Server", 11th UNSENIX Conference on Operating System Design and Implementation, Oct. 6-8, 2014, Broomfield, Colorado, pp. 583-598.

Mahajan et al., "A Distributed Block Coordinate Descent Method for Trailing L1 Regularized Linear Classifiers" arXiv:1405.4544v1 [cs.LG], May 18, 2014, 10 pages.

McMahan et al., "Ad Click Prediction: A View from the Trenches", 19th ACM SIGKDD International Conference on Knowledge Discovery and Data Mining, Aug. 11-14, 2013, Chicago, Illinois, pp. 1222-1230.

Recht et al., "Hogwild!: A Lock-Free Approach to Parallelizing Stochastic Gradient Descent" Advances in Neural Information Processing System, Dec. 12-17, 2011, Granada, Spain, pp. 693-701.

Shalev-Shwartz et al., "Stochastic Methods for L1-Regularized Loss Minimization", Journal of Machine Learning Research, vol. 12, Jul. 2011, pp. 1865-1892.

Verma et al., "Large-Scale Cluster Management at Google with Borg", European Conference on Computer Systems, Apr. 22-24, 2015, Bordeaux, France, 18 pages.

Yu et al., "Scalable Coordinate Descent Approaches to Parallel Matrix Factorization for Recommender Systems", 2012 IEEE 12th International Conference on Data Mining, Austin, Texas, Dec. 10, 2012, 10 pages.

International Search Report for PCT/US2017/017310, dated Apr. 26, 2017, 16 pages.

Yu et al., "Scalable Coordinate Descent Approaches to Parallel Matrix Factorization for Recommender Systems", 2012 IEEE 12th International Conference on Data Mining, Austin, Texas, Dec. 10, 2012, pp. 765-774.

\* cited by examiner

ROBUST LARGE-SCALE MACHINE LEARNING IN THE CLOUD

CROSS-REFERENCE TO RELATED APPLICATION

The present application is based on and claims priority to U.S. Provisional Application 62/294,683 having a filing date of Feb. 12, 2016, which is incorporated in its entirety by reference herein.

FIELD

The present disclosure relates generally to a novel, highly scalable and robust machine learning system and technique and, more particularly, to systems and methods for robust large-scale machine learning in a distributed computing environment.

BACKGROUND

Although distributed machine learning (ML) algorithms have been extensively studied, scaling to a large number of machines can still be challenging. Most fast converging single machine algorithms update model parameters at a very high rate which makes them hard to distribute without compromises. As one example, the single-machine stochastic gradient descent (SGD) technique updates model parameters after processing each training example. As another example, the coordinate descent (CD) technique updates the model parameters after processing a single feature.

Common approaches to distribute SGD or CD break the basic flow of the single-machine algorithm by letting updates occur with some delay or by batching. However, this changes the convergence behavior of the algorithm, making it sensitive to the number of machines as well to the computing environment. As a result, scaling can become non-linear and the benefit from adding more machines can tail off early.

Because of these scaling problems, some authors have argued that it is better to scale out ML algorithms using just a few 'fat' servers with lots of memory, networking cards, and GPUs. While this may be an appealing approach for some problems, it has obvious scaling limitations in terms of I/O bandwidth. Generally speaking, it is also more expensive than scaling out using low-cost commodity servers. GPUs in particular are not always a cost effective solution for sparse datasets.

SUMMARY

Aspects and advantages of embodiments of the present disclosure will be set forth in part in the following description, or may be learned from the description, or may be learned through practice of the embodiments.

One exemplary aspect of the present disclosure is directed to computer-implemented method. The method includes obtaining, by one or more computing machines, a training dataset useful to machine learn a plurality of model parameters. The training dataset includes a plurality of examples. Each example includes entries for a plurality of features. The plurality of features respectively correspond to the plurality of model parameters. The method further includes partitioning, by the one or more computing machines, the plurality of features into a plurality of blocks. At least one of the plurality of blocks contains at least two features.

Another exemplary aspect of the present disclosure is directed to a distributed computing system to perform large-scale machine learning. The system includes a master computing machine that includes at least one processing device. The system includes a plurality of worker computing machines under control of the master computing machine. Each worker computing machine includes at least one processing device. The system is configured to partition a plurality of features of a training dataset into a plurality of blocks. The training dataset includes a plurality of examples. Each example includes entries for the plurality of features. At least one of the plurality of blocks includes at least two features. The system is further configured to perform a plurality of iterations of a machine learning technique to learn a plurality of parameters of a model from the plurality of blocks. The plurality of parameters respectively correspond to the plurality of features. The system is configured to process only one of the plurality of blocks per iteration.

Another exemplary aspect of the present disclosure is directed to a structured numerical representation that represents at least a plurality of parameters of a linear model. The structured numerical representation was produced by a process. The process includes obtaining, by a distributed computing system, a training dataset. The training dataset includes a plurality of examples. Each example includes entries for a plurality of features. The plurality of features respectively correspond to the plurality of parameters of the linear model. The process further includes partitioning, by the distributed computing system, the plurality of features into a plurality of blocks. At least one of the plurality of blocks contains at least two features. The process further includes performing, by the distributed computing system, a plurality of iterations of a machine learning technique to learn values for the plurality of parameters of the linear model from the plurality of blocks. Performing the plurality of iterations includes processing, by the distributed computing system, only one of the plurality of blocks per iteration.

Other aspects of the present disclosure are directed to systems, methods, apparatus, and tangible non-transitory computer-readable media for implementing one or more aspects described herein.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

DETAILED DESCRIPTION

Overview of the Present Disclosure

Generally, the present disclosure provides systems and methods for robust large-scale machine learning. In particular, the present disclosure provides a new scalable coordinate descent (SCD) algorithm for generalized linear models that overcomes the scaling problems outlined above in the Background section. The SCD algorithm described herein is highly robust, having the same convergence behavior regardless of how much it is scaled out and regardless of the computing environment. This allows SCD to scale to thousands of cores and makes it well suited for running in a distributed computing environment such as, for instance, a cloud environment with low-cost commodity servers.

In particular, by using a natural partitioning of parameters into blocks, updates can be performed in parallel a block at a time without compromising convergence. In fact, on many real-world problems, SCD has the same convergence behavior as the popular single-machine coordinate descent algorithm. Thus, the present disclosure provides a new scalable coordinate descent algorithm (SCD) whose convergence behavior is always the same, regardless of how much SCD is scaled out and regardless of the computing environment.

In addition to the SCD algorithm, the present disclosure also provides a distributed computing system that addresses the specific challenges of scaling SCD in a cloud computing environment. For instance, straggler handling is a significant challenge to achieving linear scaling with SCD and particular exemplary techniques for straggler handling are provided herein. Thus, the present disclosure also provides a distributed system for SCD that can provide near linear scaling using thousands of cores.

Finally, to demonstrate SCD's cost effectiveness and scalability, the present disclosure also provides an overview of experimental results obtained through use of a real advertising dataset. In particular, experimental results are provided from a cloud computing system using low-cost preemptible virtual machines to show that SCD can solve large-scale ML problems with one trillion training examples.

Exemplary Machine Learning Environment

Figure 1:
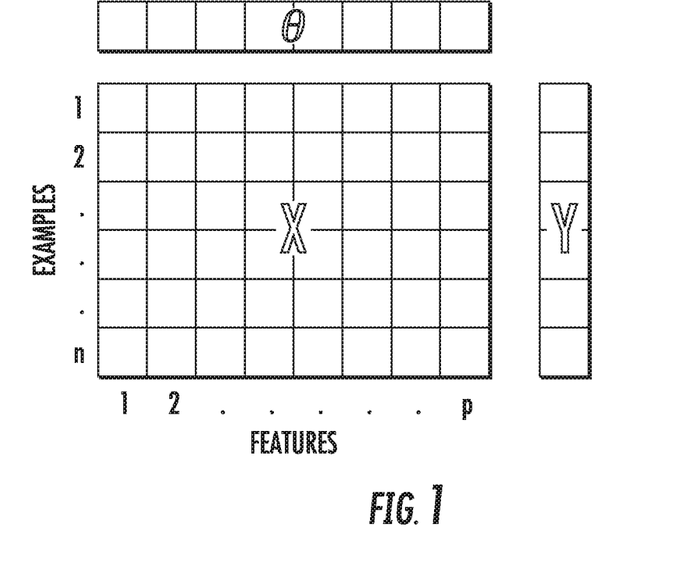
FIG. 1 depicts a graphical representation of model parameters for a training dataset with labels according to exemplary embodiments of the present disclosure.

In some implementations of the present disclosure, the systems and methods described herein can be applied to generalized linear models with large sparse datasets. Linear models are popular in industry for large-scale prediction tasks because of their high prediction quality and interpretability. For instance, FIG. 1 depicts a graphical representation of model parameters θ for a training dataset X with labels Y according to exemplary embodiments of the present disclosure.

In particular, let $x \in \mathbb{R}^p$ be a feature vector and y an unknown variable of interest (e.g., click/non-click, rating, etc.). A linear model $\hat{y}: \mathbb{R}^p \to \mathbb{R}$ assumes a linear dependency between the input feature vector $\mathbb{R}$ and the variable of interest y as follows:

$$\hat{y}(x) = \langle \theta, x \rangle = \Sigma_{i=1}^p \theta_i x_i \qquad (1)$$

where $\theta \in \mathbb{R}^p$ are the model parameters that parameterize the dependency.

Using a link function, linear models can be generalized (GLM) to prediction tasks such as logistic regression (binary classification), Poisson regression (count data), etc. Note that even though a linear model assumes a linear dependency in x, in some implementations of the present disclosure, non-linearity can be introduced by preprocessing x (e.g., using polynomial expansions or log-transformations). Preprocessing allows linear models to be very expressive and highly non-linear in the original space. The remainder of the present disclosure assumes that a proper preprocessing has been done, if desired, and that x is the feature vector after transformation.

As an exemplary instance of an optimization task, ML algorithms can learn the values of the model parameters θ given a set S of labeled training examples (x, y). In matrix notation, $X \in \mathbb{R}^{|S| \times p}$ is the design matrix with labels $y \in \mathbb{R}^{|S|}$. One exemplary optimization task is to find the model parameters that minimize a loss:

$$\mathrm{argmin}_{\theta \in \mathbb{R}^p} \Sigma_{(x,y) \in S} l(y, \hat{y}(x)) + \lambda \|\theta\|^2 \qquad (2)$$

where l is a loss function that depends on the optimization task. In exemplary instances, a squared loss $l(y, \hat{y}) := (y-\hat{y})^2$ can be used or a logistic loss $l(y, \hat{y}) := -y\hat{y} + \ln(1 + \exp(\hat{y}))$ can be used. The notation λ can be a regularization value used for generalization. For simplicity, L2 regularization will be assumed. However, all of the discussion provided herein can also be extended to L1 regularization.

According to another aspect of the present disclosure, the systems and methods described herein can be applied to datasets with potentially trillions of training examples, that is, $|S| \in \mathcal{O}(10^{12})$. Consequently, the training data does not typically fit in currently available memory capacities. The systems and methods described herein can also be applied to models with billions of features, that is, $p \in \mathcal{O}(10^9)$. The model will usually fit in memory, but the solutions described herein can also handle models that are larger than the available memory.

Figure 2:
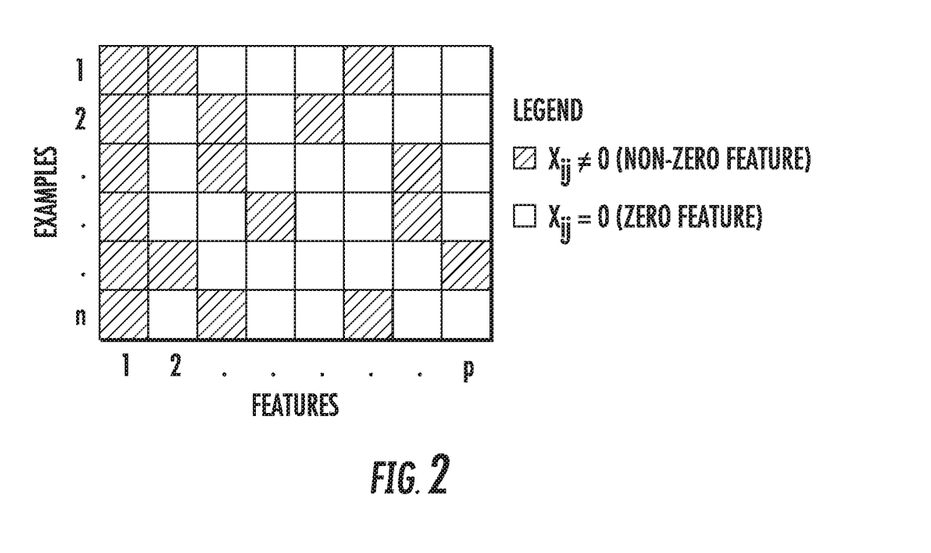
FIG. 2 depicts a graphical representation of an exemplary sparse dataset according to exemplary embodiments of the present disclosure.

Typically, a training dataset with lots of features will also have a lot of sparsity. There might be billions of features, but only a small number (e.g., hundreds) of non-zero features per example. For instance, FIG. 2 depicts a graphical representation of an exemplary sparse dataset according to exemplary embodiments of the present disclosure. In FIG. 2, non-zero features are indicated by shaded cells while zero-valued features are shown without shading.

The reason for high sparsity is usually because of one-hot encoded categorical variables. For instance, part of the feature vector x might contain a country variable that is represented by a binary vector with as many entries as there are countries. But each binary vector will contain only one non-zero entry, corresponding to the selected country. For variables like countries, there might be only hundreds of entries, whereas for variables like video IDs or user IDs, there might be billions of entries, leading to very high sparsity. However, the approach provided herein is not limited to categorical variables but supports any kind of real-valued feature vector $x \in \mathbb{R}^p$.

For instance, let $N_z(x)$ be the number of non-zeros in a feature vector x or design matrix X. ML algorithms can make use of the sparsity and usually have a runtime in the order of $N_z(x)$ instead of $|S| \times p$.

Exemplary Computing Environment

According to another aspect of the present disclosure, the systems and methods described herein can be implemented in the context of a cloud computing environment. Cloud computing has become a cost effective solution for many applications, particularly for batch applications that need to scale with their data size.

As such, although the systems and methods described herein can be applied to any large-scale distributed computing environment, the exemplary implementations discussed in the present disclosure focus on a cloud computing environment with the following properties: Shared Machines; Distributed File System; Preemptible VMs; and Machine Failures, as described below.

Shared Machines: To increase utilization, each physical machine can be shared by multiple virtual machines (VMs).

Distributed File System: A fault tolerant distributed file system (DFS), such as the Google File System™, is available to store data. In addition to training data, the DFS can be used to save any application state needed for fault tolerance.

Preemptible VMs: The cloud scheduler is free to preempt a low-priority VM in favor of a higher-priority one. All of a VM's state is lost when it is preempted. However, a notification is sent to a VM before it is preempted. This includes a grace period that is long enough for the application to save its state to the DFS for fault tolerance, if necessary.

Machine Failures: Physical machines can fail without any notification. Failures are assumed to be rare, but do happen. Consequently, long-running jobs need to checkpoint their state to the DFS for fault tolerance.

Other than preemptible VMs, the features outlined above are fairly standard properties for most modern cloud computing environments. Preemptible VMs are available on Google's Cloud Platform™ (GCP) and as "spot instances" from Amazon Web Services™ (AWS). Preemptible VMs are an attractive way to lower costs for long-running batch jobs. For instance, a preemptible VM is presently 70% less expensive than a standard VM on GCP.

In terms of cost, a cloud computing system with the above properties is particularly appealing for running distributed ML jobs. However, scaling a distributed ML algorithm on such a cloud becomes even more challenging. This is because there can be wide variations in machine performance because of contention for physical resources such as CPU and networking, or contention for software resources such as access to the DFS. Preemptions also create headaches. All these things can negatively impact convergence behavior.

The systems and methods of the present disclosure are discussed with reference to implementation in a cloud computing environment by way of explanation, not limitation of the disclosure. The systems and methods of the present disclosure are not limited to implementation in a cloud computing environment, but instead are generally applicable to distributed machine learning, regardless if it takes place in a cloud or another collection of computers.

Exemplary Goals of Distributed Learning

In terms of the learning algorithm and its distributed system design, some primary goals of the present disclosure are as follows:

1. Robust Distribution: The algorithm's convergence behavior should always be the same, regardless of how much it is scaled out and regardless of the computing environment.

2. Linear Scale-out: If the number of training examples |S| as well as the number of computing resources grow by a factor of M, the time to solve the learning problem should stay constant. This is also known as "weak scaling".

3. Linear Speed-up: If the number of computing resources grows by a factor of M, the same learning problem should be solved M times faster in wall time. This is also known as "strong scaling".

The learning algorithm and distributed system of the present disclosure satisfy all three of these goals for a wide range of problem sizes and scaling factors.

Overview and Analysis of Coordinate Descent Algorithm

In this section, an overview is provided of the popular coordinate descent (CD) algorithm, which is inherently restricted to a single machine. The CD algorithm looks at a single model parameter or coordinate $\theta_j$ at a time, assuming that the values of other model parameters $\theta \backslash \theta_j$ are known and fixed. Under this assumption, the optimum for $\theta_j$ has the following closed form solution:

$$\theta_j^* = \frac{T_j}{T'_j + \lambda}. \quad (3)$$

For linear regression, the sufficient statistics $T_j$ and $T'_j$ are as follows:

$$T_j := \Sigma_{(x,y) \in S} x_j (y - \Sigma_{i \neq j} \theta_i x_i), T'_j := \Sigma_{(x,y) \in S} x_j^2. \quad (4)$$

To simplify the discussion, linear regression is used in all the algorithm descriptions, but other loss functions can be handled similarly, such as logistic regression using a second-order Taylor expansion. For sparse data, the computation for $T_j$ and $T'_j$ can be accelerated by only iterating over examples x where $x_j \neq 0$.

From this analysis follows Algorithm 1 as shown below. As shown, CD iterates over one model parameter $\theta_j$ at a time. In each iteration, the sufficient statistics $T_j$ and $T'_j$ are aggregated (lines 8-11), and the local optimum $\theta_j^*$ is calculated (line 12). To make the cost of computing $T_j$ independent of the other features, $x \backslash x_j$, the current prediction $\hat{y}(x)$ of each example is precomputed. Using $\hat{y}(x)$, the computation of $T_j$ simplifies to the following:

$$T_j = \Sigma_{(x,y) \in S} x_j (y - \hat{y}(x) + \theta_j x_j). \quad (5)$$

The precomputed prediction $\hat{y}(x)$ for each example also needs to be updated each iteration (lines 13-15). Finally, the model parameter is updated with its local optimum (line 16).

CD is known as a fast-converging algorithm for problems that fit on a single machine. Variations on Algorithm 1 include cyclic coordinate descent and stochastic coordinate descent.

Algorithm 1

Coordinate Descent

```
1:   procedure CD(S)
2:       ŷ ← (0, . . . , 0) Precomputed predictions
3:       θ ← (0, . . . , 0)
4:       repeat
5:           for j ∈ {1, . . . , p} do
6:               T_j ← 0
7:               T'_j ← 0
8:               for (x, y) ∈ S where x_j ≠ 0 do
9:                   T_j ← T_j + x_j (y - ŷ(x) + θ_j x_j)
10:                  T'_j ← T'_j + x_j^2
11:              end for
12:              
```
$$\theta_j^* \leftarrow \frac{T_j}{T'_j + \lambda}$$

```
13:              for (x, y) ∈ S where x_j| ≠ 0 do
14:                  ŷ(x) ← ŷ(x) + x_j (θ_j* - θ_j)
15:              end for
16:              θ_j ← θ_j*
17:          end for
18:      until converged
19:  end procedure
```

Recall that CD processes one parameter at a time. A CD iteration can be defined as the update of one parameter and an epoch as a pass over all parameters. The amount of computation per iteration is on average $\mathcal{O}(N_z(X)/p)$ and per epoch $\mathcal{O}(N_z(X))$.

A straightforward distributed version of Algorithm 1 would require a system-wide synchronization barrier just after aggregating the sufficient statistics $T_j$ and $T'_j$ (lines 8-11). In general, distributing work only pays off if the overhead in terms of communication and barriers is small compared to the amount of work that is parallelized. However, with a large number p of parameters and a high sparsity $(N_z(x)<<p)$ per feature vector x, there is relatively little work to be done in an iteration of CD. Consequently, a straightforward distributed version of Algorithm 1 would neither scale-out nor speed-up.

Overview of the Scalable Coordinate Descent Algorithm

SCD increases the amount of work per iteration by carefully partitioning the parameters into a plurality of blocks and by iterating a block of parameters at a time. Scaling is achieved by computing the sufficient statistics over examples in parallel across machines. Robustness is achieved by keeping the partition fixed and independent of the number of machines. Fast convergence is achieved by a clever partitioning of parameters.

One exemplary implementation of the SCD algorithm that assumes that a partition has been given will be discussed here, and is shown below as Algorithm 2. Later, the present disclosure will discuss how to choose a good partition.

Let $\mathcal{P}$ be a partition of feature or parameter indices $\{1, \ldots, p\}$. $B \in \mathcal{P}$ is referred to as a block. The subset of parameters θ associated with the block B is denoted by $\theta^B$; the subvector of the feature vector x is denoted by $x^B$; and the submatrix of the design matrix X is denoted by $X^B$.

Figure 3:
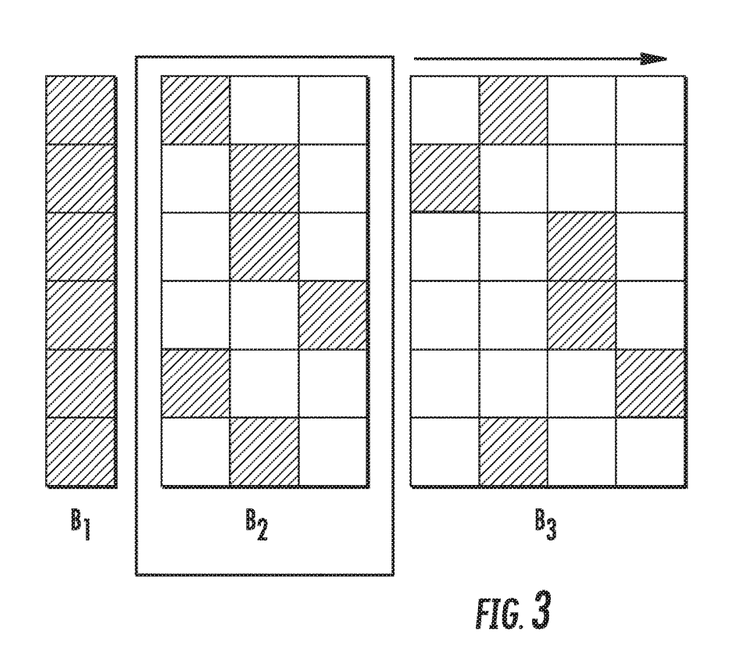
FIG. 3 depicts a graphical representation of features partitioned into blocks according to exemplary embodiments of the present disclosure.

For instance, FIG. 3 depicts a graphical representation of features partitioned into exemplary blocks $B_1$, $B_2$, and $B_3$ according to exemplary embodiments of the present disclosure. As illustrated in FIG. 3, each of the blocks B can contain one or more features. For example, block $B_1$ contains a single feature; block $B_1$ contains three features; and block $B_3$ contains four features. Thus, according to an aspect of the present disclosure, one or more of the plurality of blocks can contain two or more features. Having multiple features per block assists in overcoming the scaling problems outlined above in the Background section. However, the systems and methods of the present disclosure do not require blocks to have more than one feature. For instance, in at least one implementation, the features/parameters can be partitioned into a partitioning with one block per feature.

According to another aspect of the present disclosure, in contrast to CD which iterates over one model parameter at a time, SCD iterates over one block B of parameters at a time (see Algorithm 2, line 7). In each iteration, partial sums for the sufficient statistics T and T' are computed in parallel (lines 8-13). These are aggregated across machines (see Algorithm 2, line 14), and the new value $\theta^*_j$ of each parameter in B is calculated (see Algorithm 2, lines 15-17).

Because the sufficient statistics of several features have been computed in parallel, the independence assumptions of the CD update step (eq. 3) are violated. To ensure convergence, the common line-search method is used to find a step size $\alpha \in [0,1]$ and update each parameter with:

$$\theta_j^* = (1-\alpha)\theta_j + \alpha \frac{T_j}{T'_j + \lambda}. \tag{6}$$

Obviously, the smaller the step size α, the slower the convergence in comparison to CD. In further discussion contained below, it is shown that by using a clever partitioning, SCD can usually take optimal steps, in which case α=1. After the new value has been calculated, the precomputed predictions ŷ(x) for each example are updated (see Algorithm 2, lines 18-22). Finally, each model parameter in B is updated with its new value (see Algorithm 2, lines 23-25).

Algorithm 2

Scalable Coordinate Descent

```
1:   procedure SCD (S, 𝒫)
2:       θ ← (0, . . . , 0)
3:       ŷ ← (0, . . . , 0) Precomputed predictions
4:       repeat
5:           T ← {0, . . . , 0}
6:           T' ← {0, . . . , 0}
7:           B ← SelectBlock (𝒫)
8:           for (x, y) ∈ S do In parallel, across machines
9:               for j ∈ B where x_j ≠ 0 do
10:                  T_j ← T_j + x_j(y - ŷ(x) + θ_j x_j)
11:                  T'_j ← T'_j + x_j^2
12:              end for
13:          end for
14:          Aggregate T and T' across machines.
15:          for j ∈ B do
16:              
```
$$\theta_j^* \leftarrow (1-\alpha)\theta_j + \alpha \frac{T_j}{T'_j + \lambda}$$

```
17:          end for
18:          for (x, y) ∈ S do In parallel, across machines
19:              for j ∈ B where x_j ≠ 0 do
20:                  ŷ(x) ← ŷ(x) + x_j(θ_j* - θ_j)
21:              end for
22:          end for
23:          for j ∈ B do
24:              θ_j ← θ_j*
25:          end for
```

-continued

Algorithm 2

Scalable Coordinate Descent

26:     until converged
27:     end procedure In Algorithm 2, it is important to note that parallel execution is done over examples. For instance, such parallel execution over examples can be achieved by sharding examples into a plurality of shards. This means that each machine is responsible for computing the partial sufficient statistics T and T' for all the parameters $\theta^B$ in the selected block B but only for a subset of examples.

Consequently, the more machines, the faster sufficient statistics are computed. As long as the amount of work for a block is large enough, SCD scales with more machines. Moreover, as the partition is fixed and does not change with the number of machines, SCD is robust.

Exemplary Optimal Updates with Pure Blocks

So far, the robustness and scalability have been discussed. This section focuses on convergence speed. One key idea of the present disclosure is to partition the model parameters into what can be referred to as pure blocks of independent parameters. The discussion below proves that parallel updates within a pure block are equivalent to processing the updates sequentially and consequently, that full update steps $\alpha=1$ can be taken.

DEFINITION 1: (PURE BLOCK). A block B is pure if and only if the feature subvector $x^B$ of every example (x, y)$\in$S has at most one non-zero entry:

$$B \text{ pure:} \Leftrightarrow \forall (x,y) \in S : N_z(x^B) \leq 1$$

Similarly, a partition $\mathcal{P}$ of $\{1, \ldots, p\}$ is pure if all the blocks in the partition B$\in\mathcal{P}$ are pure.

LEMMA 1: (INDEPENDENCE OF UPDATES). All parameter updates in the partition B$\in\mathcal{P}$ are pure.

PROOF: The well-known closed form solution of a regularized least-squared problem is $\theta=(X^TX+\lambda I)^{-1}Xy$. Let $\tilde{B}:=\{1,\ldots,p\}\setminus B$. Consequently, the closed form solution for the parameters of the block B is $\theta^B=((X^B)^TX^B+\lambda I)^{-1}X^B(y-X^{\tilde{B}}\theta^{\tilde{B}})$. Because B is pure, the Gramian $(X^B)^TX^B$ is a diagonal matrix diag(T'$_1$, T'$_2$, ... ). It follows that the standard CD update (eq. 3) is identical to the joined closed form solution for all parameters $\theta^B$ of the block. This means that, within a pure block B, the update of one parameter does not influence the update of another parameter. End proof.

One upshot of Lemma 1 is that, within a pure block, processing parameter updates in parallel is equivalent to processing the updates sequentially. In other words, SCD on pure partitions is equivalent to CD while allowing scaling.

Note that purity and robustness are two different concepts. SCD is robust no matter if a pure or impure partition has been chosen. Pure partitions are preferred because optimal step sizes can be taken.

For instance, each of the blocks $B_1$, $B_2$, and $B_3$ shown in FIG. 3 are pure blocks. In particular, the feature subvector of each respective example in one of the blocks $B_1$, $B_2$, and $B_3$ contains at most one non-zero entry.

Exemplary Techniques to Generate a Partition

This section describes exemplary techniques to construct a partition for a training set S=(X, y). In some implementations, a good partition has two properties: (1) pure blocks for convergence speed; and (2) a large amount of work per block for system speed.

At first glance, simultaneously fulfilling both properties appears challenging. However, most real-world datasets have a natural partition with good properties. As mentioned above, input feature vectors x are usually generated from several variables.

According to an aspect of the present disclosure, the features can be partitioned by variable. More particularly, for each variable v, a block can be constructed that corresponds to the features generated from v. The properties of such a partition are: (1) For many variable types, the resulting blocks are pure. This includes categorical variables, a cross product of categorical variables, bucketized numerical variables, dense numerical variables, etc. (2) For these variables, each resulting block is of equal computational complexity with $N_z(X^B)=|S|$.

To summarize, a natural partition by underlying variable often has all desired properties. Many real-world datasets are composed of these variable types.

Some datasets contain variable types with suboptimal properties. One instance is a set-valued variable, such as the genres of a movie, where several genres can be assigned to one movie. In this case, a split by variable would result in an impure block.

According to another aspect of the present disclosure, to accommodate the above-described scenario in which a split by variable would result in one or more impure blocks, the features of such a variable v can be split into $N_z(X^v)/|S|$ blocks. Splitting the features in this fashion means there will be one active feature per block on average. However, there can still be training examples with more than one active feature. That means the blocks of a set variable can be impure and a step size $\alpha<1$ can be used.

Exemplary Analysis of SCD Algorithm

In some implementations, an SCD iteration processes one block B of model parameters at a time. The computational complexity for an iteration is $\mathcal{O}(N_z(X^B))$. Updating all parameters, that is, one SCD epoch, takes $|\mathcal{P}|$ iterations, so the overall complexity of one epoch is $\mathcal{O}(N_z(X))$.

Although it is not shown in Algorithm 2, a small number of synchronization barriers are required in each SCD iteration. More will be said about this below when an exemplary system to implement SCD is described. Consequently, the number of barriers per SCD epoch is $\mathcal{O}(|\mathcal{P}|)$.

Compared to CD, SCD decreases the number of barriers from $\mathcal{O}(p)$ to $\mathcal{O}(|\mathcal{P}|)$. On a large sparse dataset, this can mean hundreds of barriers instead of billions of barriers. The decrease in the number of barriers, along with an increase in the amount of work per barrier, contributes to the feasibility of distributing SCD over a large number of machines.

The SCD algorithm meets the three goals described in the Exemplary Goals of Distributed Learning section above. First, SCD is robust in the sense that it performs exactly the same update computations no matter how many machines it uses. Moreover, the outcome of each SCD update step is deterministic and unaffected by the computing environment. Second, the increase of work per iteration allows SCD to theoretically scale linearly. In practice, various system overheads and stragglers become a limiting factor, as will be described further below.

Exemplary Distributed SCD Systems and Methods

Figure 4:
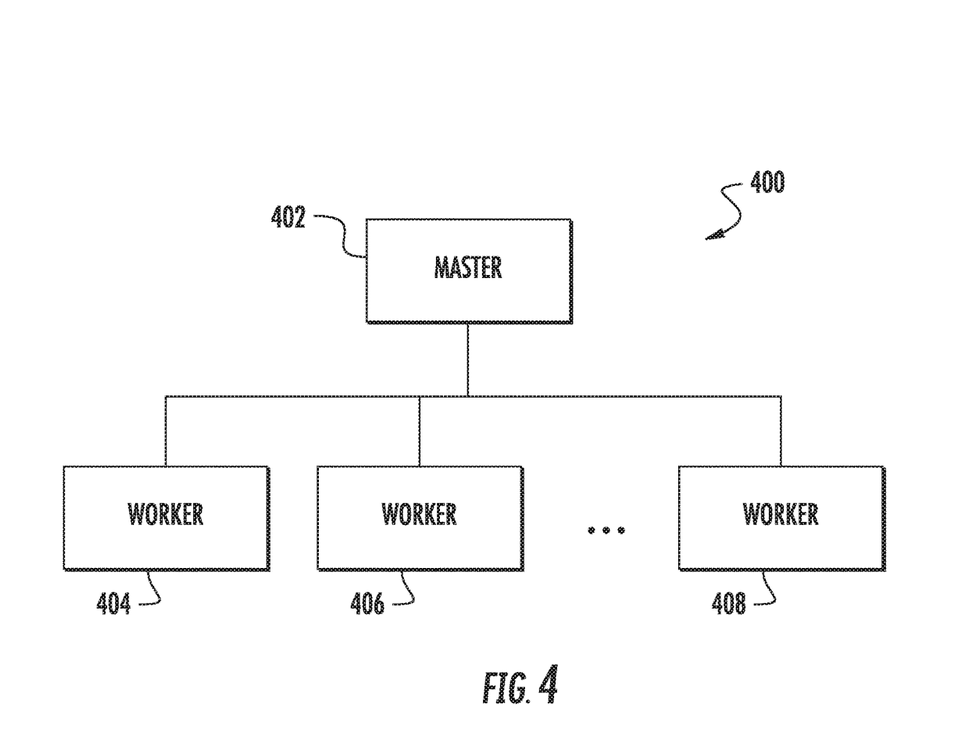
FIG. 4 depicts an exemplary distributed computing system according to exemplary embodiments of the present disclosure.

In this section, a distributed system that addresses the specific challenges of scaling SCD in a cloud computing environment is provided. In particular, FIG. 4 depicts an exemplary distributed computing system 400 according to exemplary embodiments of the present disclosure. The architecture of the exemplary system 400 includes a single master computing machine 402 (hereinafter "master") and multiple worker computing machines (e.g., worker computing machines 404, 406, and 408 (hereinafter "worker"). Although only three workers 404-408 are illustrated, the system 400 can include any number of workers, including, for instance, hundreds of workers with thousands of cores.

Each of the master computing machine 402 and the worker computing machines 404-408 can include one or more processing devices and a non-transitory computer-readable storage medium. The processing device can be a processor, microprocessor, or a component thereof (e.g., one or more cores of a processor). In some implementations, each of the master computing machine 402 and the worker computing machines 404-408 can have multiple processing devices. For instance, a single worker computing machine can utilize or otherwise include plural cores of one or more processors.

The non-transitory computer-readable storage medium can include any form of computer storage device, including RAM (e.g., DRAM), ROM (e.g., EEPROM), optical storage, magnetic storage, flash storage, solid-state storage, hard drives, etc. The storage medium can store one or more sets of instructions that, when executed by the corresponding computing machine, cause the corresponding computing machine to perform operations consistent with the present disclosure. The storage medium can also store a cache of data (e.g., previously observed or computed data), as will be discussed further below.

The master computing machine 402 and the worker computing machines 404-408 can respectively communicate with each other over a network. The network can include a local area network, a wide area network, or some combination thereof. The network can include any number of wired or wireless connections. Communication across the network can occur using any number of protocols.

In some implementations, two or more of the master computing machine 402 and the worker computing machines 404-408 can be implemented using a single physical device. For instance, two or more of the master computing machine 402 and the worker computing machines 404-408 can be virtual machines that share or are otherwise implemented by a single physical machine (e.g., a single server computing device).

In one exemplary implementation, each of the master computing machine 402 and the worker computing machines 404-408 is a component of a computing device (e.g., server computing device) included within a cloud computing environment/system. In particular, the computing system 400 can be implemented using a cloud computing system that complies with the properties described in the Exemplary Computing Environment section above, such as, for instance, Google's Cloud Platform™ (GCP) and Amazon Web Services™ (AWS).

According to an aspect of the present disclosure, the master 402 can act as the orchestrator and can be responsible for assigning work, while the workers 404-408 can execute the computationally expensive parts of the SCD algorithm. To assign work, the master 402 can hand out work items to workers 404-408. Each work item can correspond to a small unit of work that usually takes only a few hundred milliseconds to execute. Both the master 402 and workers 404-408 can be multi-threaded to take advantage of multi-core parallelism.

A single master can become a scaling bottleneck at some point. But as the performance experiments discussed below show, even a single master can scale to hundreds of workers with thousands of cores.

Figure 5:
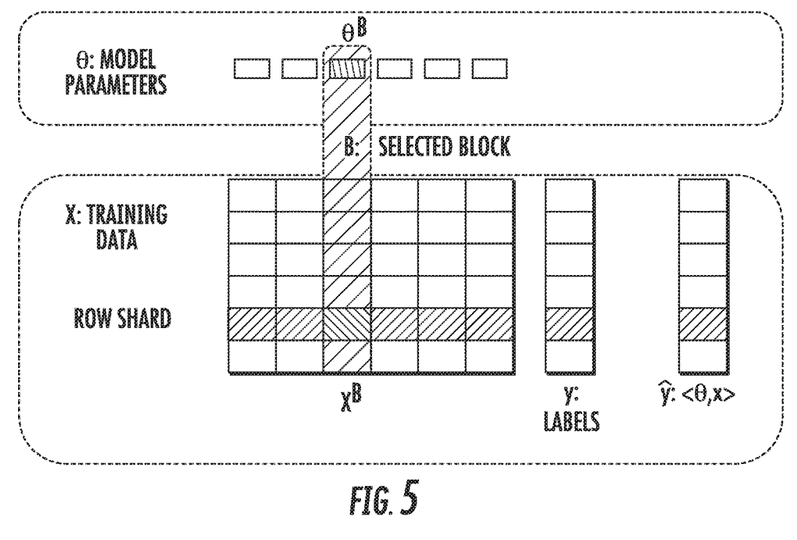
FIG. 5 depicts a graphical representation of data sharded in both the feature and example dimensions according to exemplary embodiments of the present disclosure.

According to another aspect of the present disclosure, as shown in FIG. 5, the training data S=(X, y) for SCD can be sharded in both the feature and example dimensions. The training data is sharded in the feature dimension using the block partition $\mathcal{P}$ (i.e., the sharding follows $\mathcal{P}$), while it is sharded in the example dimension using row sharding. Feature sharding enables SCD to process the data corresponding to one block independently of the other blocks, while example sharding enables SCD to process different shards of $X^B$ in parallel.

Figure 6:
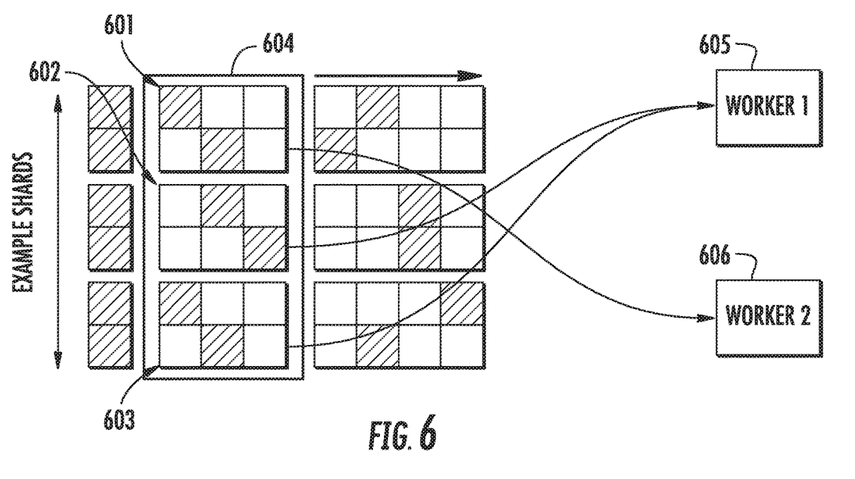
FIG. 6 depicts a graphical representation of example shards of a block provided to worker machines according to exemplary embodiments of the present disclosure.

In particular, as will be discussed further below, sharding in the example dimension enables workers to operate on the example shards in parallel and in a distributed fashion. For instance, FIG. 6 depicts a graphical representation of example shards 601, 602, and 603 of a block 604 provided to respective worker machines 605 and 606 according to exemplary embodiments of the present disclosure. In particular, example shard 601 is provided to worker machine 606, while example shards 602 and 603 are provided to worker machine 605.

Referring again to FIG. 5, the remaining data is sharded as follows. The model parameters θ are sharded in just the feature dimension (following $\mathcal{P}$), while the labels y and predictions ŷ are sharded in just the example dimension (following the row sharding).

Each cell in the grid can be stored in separate file. The file can hold the data of many examples for one block. For instance, if there were p=$10^9$ features partitioned into | $\mathcal{P}$ |=100 blocks and |S|=$10^{10}$ examples sharded in $10^4$ rows with $10^6$ examples each, then the design matrix X could be stored in $10^4 \ast 100 = 10^6$ files. Thus, while cells in FIGS. 1, 2, 3, and 6 are generally representative of a single value, the cells of FIG. 5 can correspond to a large set of examples, parameters, labels, predictions, as the case may be.

Figure 7:
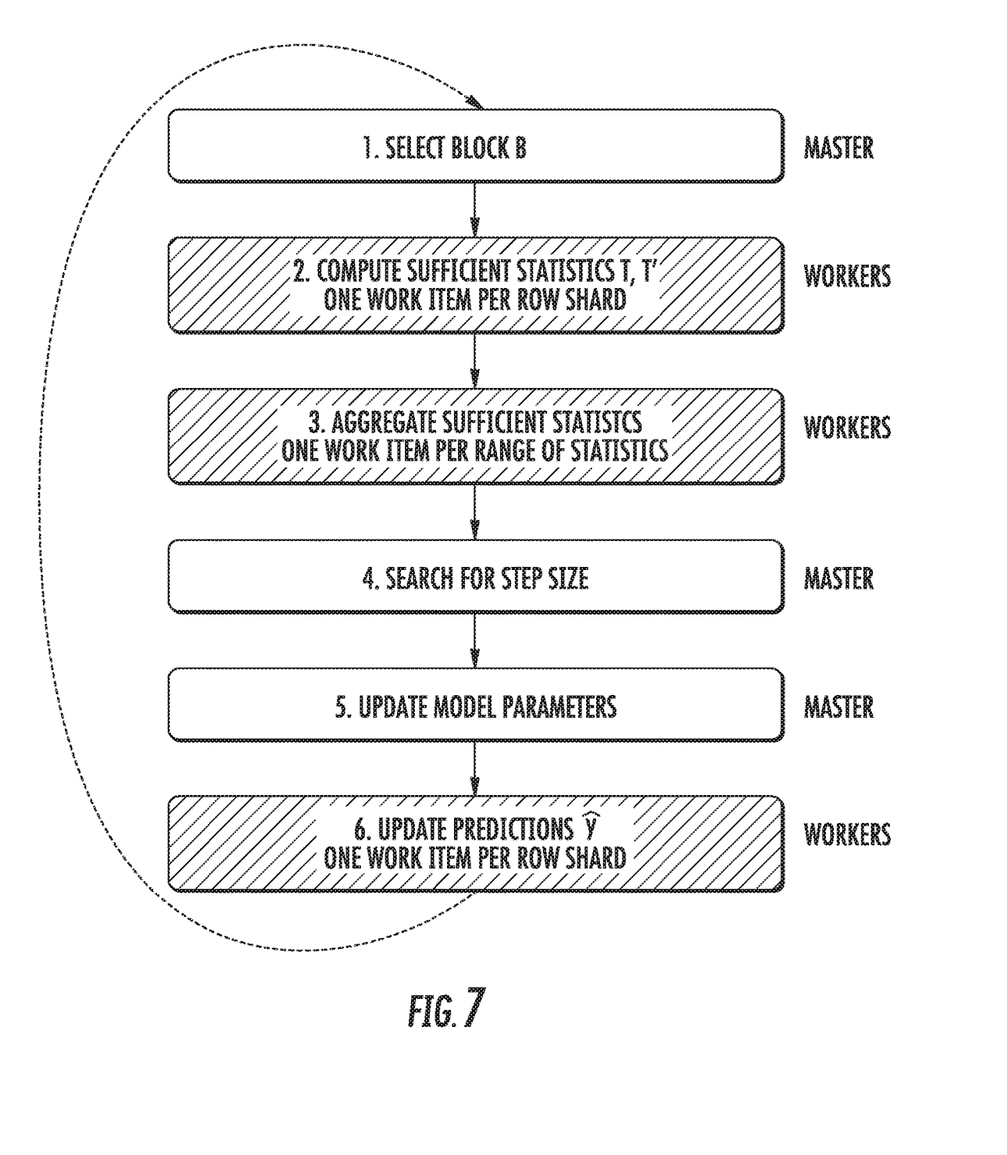
FIG. 7 depicts a flow chart diagram of one iteration of the scalable coordinate descent algorithm according to exemplary embodiments of the present disclosure.

Recall that the main loop of the SCD algorithm iterates over one block of parameters at a time (see Algorithm 2, lines 4-26). In some implementations, as illustrated in FIG. 7, one iteration of this loop can translate into the following steps:

1. Select block: The master selects a block B based on various heuristics that try to estimate which block will have the largest impact on convergence.

2. Compute sufficient statistics: The workers compute the partial sums of sufficient statistics T and T' over the row shards of block B. These partial sums are stored in the memory of the workers.

3. Aggregate sufficient statistics: The sufficient statistics of the workers are aggregated and sent back to the master.

4. Search for step size: The master chooses a step size according to the line-search method described in the Overview of the Scalable Coordinate Descent Algorithm section above.

5. Update model parameters: The master updates the model parameters θ of block B using the chosen step size and the sufficient statistics.

6. Update predictions: The workers update their predictions ŷ to reflect the change in the model parameters.

The steps in this flow are depicted in FIG. 7. The master can execute the steps sequentially, either by performing the step itself (e.g., steps 1, 4, and 5) or by assigning work items to the workers for the steps that are computationally expensive (e.g., steps 2, 3, and 6). The latter can be distributed over the workers and executed in parallel.

The sequential execution of the steps effectively creates a system-wide barrier for the workers after steps 2, 3, and 6. Typically, a whole iteration of SCD takes less than a minute, which means there is a system-wide barrier every few seconds. Handling stragglers, preempted and/or failed workers, and executing a system-wide barrier at this rate presents certain challenges. The steps assigned to workers are now described in more detail.

With respect to computing sufficient statistics, the workers can compute the partial sums for the sufficient statistics over row shards of the selected block (see Algorithm 2, lines 8-13; and FIG. 6). Each worker can be multi-threaded and the threads can execute work items in parallel. Each work item can refer to one row shard in this case. Given a work item, a worker thread can obtain the training data, labels y, and predictions ŷ for the corresponding row shard in order to compute the statistics. These can be found in the worker's cache, in another worker's cache, or in the DFS. More detail about the caches maintained by each worker is provided below.

Sufficient statistics can be stored in the memory of each worker using a thread-local store for the one-hundred thousand most-frequent features and a worker-level store (over all threads) for the remaining features. This two-level scheme improves hardware cache locality and also enables lock-free updates of the statistics. Update collisions can occur in the worker-level store, but they have a very low probability of happening since it is only used for infrequent features.

Figure 8:
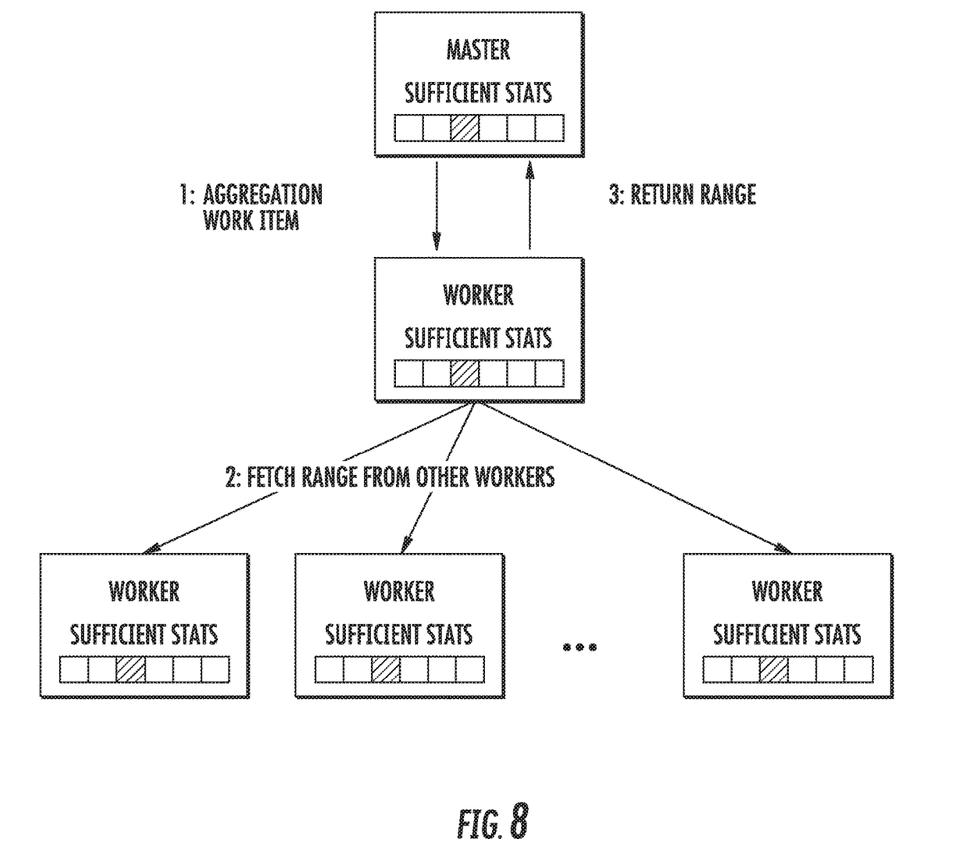
FIG. 8 depicts a graphical diagram of the aggregation of sufficient statistics by an exemplary distributed computing system according to exemplary embodiments of the present disclosure.

After the partial sums for the sufficient statistics have been computed by the workers, they can be aggregated across workers (see Algorithm 2, line 14). If each worker sent back its statistics to the master, it would create a scaling bottleneck due to the TCP Incast problem. Instead, according to an aspect of the present disclosure, the statistics can be partitioned into ranges and the aggregation can be distributed among the workers. For instance, FIG. 8 depicts a graphical diagram of the aggregation of sufficient statistics by an exemplary distributed computing system according to exemplary embodiments of the present disclosure.

Each work item can refer to one range of the sufficient statistics in this case. For load balancing, each range can be sized to be about 128 KB. The worker thread assigned a particular work item can become the aggregator for the corresponding range of statistics. It can collect the statistics for the range from the other workers, perform the aggregation, and then send the aggregated range to the master. Multiple ranges can be aggregated in parallel across the workers to take advantage of all the available networking bandwidth.

For instance, let |W| be the number of workers, and let r>|B|/|W| be the number of aggregation ranges, where |B| is the number of features in a block. The size of each range is |B|/r. Each range creates $$|W|\frac{|B|}{r}$$

inbound network traffic for the aggregator, |B|/r outbound traffic for each (leaf) worker, and |B|/r inbound traffic for the master. This means that, over all ranges, each worker has |B| inbound and outbound network traffic, while the master has |B| inbound traffic. Consequently, the network traffic of the workers and the master remains constant, no matter how many workers there are.

After the master updates the model parameters, the predictions ŷ can be updated to reflect the change in the model parameters (see Algorithm 2, lines 18-22). Each work item can refer to one row shard in this case. Given a work item, a worker thread can obtain the training data and labels y for the corresponding row shard in order to update the predictions. Again, these can be found in the worker's cache, in another worker's cache, or in the DFS.

As noted above, straggler handling can be a significant challenge to achieving linear scaling. In particular, SCD theoretically scales perfectly. However, in practice, various overheads and stragglers become a limiting factor. Up to about one thousand workers, stragglers are by far the biggest limiting factor. After that, the single master design becomes the limiting factor.

Recall that there is a system-wide barrier for the workers after steps 2, 3, 6 in the SCD system flow (see FIG. 7). Therefore, the time it takes to execute these steps is gated by the slowest worker, that is, the worst straggler. Straggler effects get amplified the more a system is scaled-out. Stragglers are especially challenging in SCD because there is a barrier every few seconds. Moreover, the more SCD is sped-up, the shorter the time between barriers.

Stragglers are usually caused by variations in CPU, networking, or DFS performance. In some implementations of the present disclosure, dynamic load balancing is the main mechanism used to deal with stragglers. Dynamic load balancing eliminates most of the stragglers caused by CPU and networking performance. However, because of tail latencies, in some implementations, load balancing alone is not sufficient to handle some DFS stragglers. Caching and prefetching can be added to deal with these tail latencies.

With respect to dynamic load balancing, the DFS enables any worker to work on any work item. Any time a worker thread is idle, it asks the master for a new work item. This results in dynamic load balancing similar to that in a multithreaded program, where faster workers get assigned more work items, and vice versa for slower workers. In some implementations, to facilitate load balancing, the system is configured so that there are at least four work items per worker thread.

In some implementations, the systems and methods of the present disclosure also leverage caching and prefetching to provide improved performance. More particularly, in a cloud computing environment with shared access to the DFS, tail latencies can be as bad as several seconds. The best way to mitigate these tail latencies is to avoid the DFS as much as possible using caching. Thus, files for the training data, labels y, and predictions ŷ can be cached in each worker using a least recently used ("LRU") eviction strategy. Compressed files can be cached in memory and decompressed when a worker needs to access them.

In some implementations, to improve caching, the master tries to assign the same row shard to a given worker in each iteration of its main loop. If a row shard ends up being "stolen" by a different worker because of load balancing, the new worker can avoid accessing the DFS by requesting the row shard's files from the old worker's cache. When this happens, hedged-requests can be used to avoid a worker that is slow to respond. A request can be sent to both the old worker and the DFS. The first request to finish is the "winner" and the "loser" is canceled.

Using compression, even a small cache for the labels y and predictions ŷ can be highly effective. However, caching is less effective for the training data. This is because each iteration of the SCD algorithm accesses the training data associated with a different block B. As a result, the cache hit rate for training data tends to be much lower. This means that workers have to frequently access the DFS for training data. To minimize the impact of tail latencies in this case, training data for the next iteration is prefetched. As a result, even a very slow DFS access has no effect as long as it is shorter than a whole iteration.

In some implementations, the systems and methods of the present disclosure can also include techniques to deal with VM preemptions. In particular, recall that a notification can be sent to a VM before it is preempted. This can include a grace period that is long enough for the application to save its state to the DFS for fault tolerance, if necessary. According to an aspect of the present disclosure, this grace period can be used to drain a worker that will be preempted. For instance, when a worker is notified that it will be preempted, it simply stops asking for new work items. As a result, other workers end up stealing all the preempted worker's row shards and associated data.

In some implementations, the master is usually configured using a standard VM to prevent preemptions. However, even if the master is configured with a preemptible VM, there is only one master and many workers, so the chances of it being preempted are low. If the master is preempted, it can be treated as a machine failure.

Machine failures are very rare but do happen. In some implementations, the predictions ŷ for a row shard are only written to the DFS when they are evicted from a worker's cache. Consequently, predictions can be lost if a worker fails. When this happens, a recovery phase orchestrated by the master can simply re-compute the lost predictions.

Of course, the master can also fail. Therefore, at the end of each iteration, the master can take a checkpoint of its state to the DFS which includes the current value of the model parameters θ. As such, if the master fails and is restarted, it can use the last checkpoint to recover its state and resume from where it left off.

Exemplary Experimental Data

In this section, the performance of SCD on a large-scale advertising dataset is investigated. The dataset has 1.7 billion parameters ($p=1.7*10^9$) with a pure partition in $|\mathcal{P}|=194$ blocks. Several scales of the dataset were experimented with from twenty billion examples with four trillion non-zero elements in the design matrix up to one trillion examples ($|S|=10^{12}$) and two-hundred trillion non-zero elements ($N_z(X)=2*10^{14}$).

CD is considered a fast solver for linear models and is a popular choice for single machine implementations (e.g., LIBLINEAR or glmnet). As shown in the Exemplary Optimal Updates with Pure Blocks section above, on pure partitions, SCD produces the same models with an identical convergence behavior as CD. Thus, the presently described experiments focused on runtime and scaling questions. In particular, the scale-out and speed-up of SCD were investigated.

All experiments were run in the internal Google™ cloud using low-priority, preemptible VMs. Each VM used 8 cores and less than 30 GB of memory. A comparable preemptible VM in Google's™ external cloud is the n1-standard-8 with an hourly price of $0.12. The workers were overthreaded by a ratio of 2:1 to hide I/O latency.

As defined in Exemplary Goals of Distributed Learning section above, scale-out refers to a system's behavior when the problem as well as the number of machines grows. The presently described experiments considered M∈{1, 2, 4, 8, 16, 32, 50} scales of the dataset and increased the number of machines accordingly by the same factor M. For each of the M scale-out variants, SCD was run for one epoch, e.g., 194 iterations, and the average iteration time was reported. The baseline 1× experiment used 20 machines for 20 billion training examples, the 2× scale-out used 40 machines for 40 billion training examples, etc. Note that on the 50× scale, the dataset consisted of 1 trillion examples which is 10000× more data points than the 'large-scale' Netflix™ prize dataset. The compressed 50× dataset takes about one petabyte on the DFS incl. standard replication.

Figure 9:
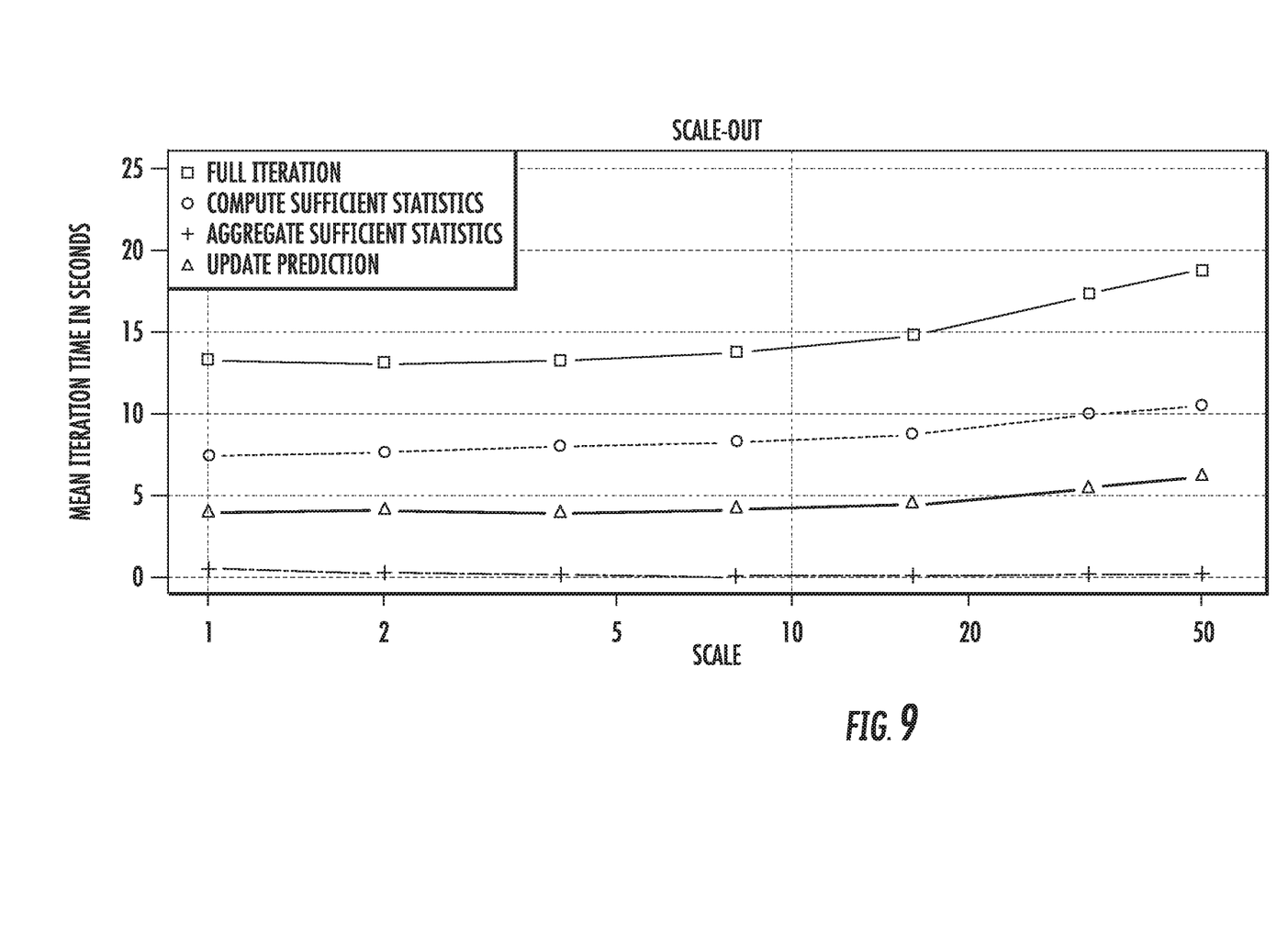
FIG. 9 depicts a graph of exemplary experimental results showing the scale-out behavior of the scalable coordinate descent algorithm according to exemplary embodiments of the present disclosure.

FIG. 9 shows the scale-out behavior of SCD. Compared to a perfect linear scaling, SCD shows less than 10% degradation for a 16× (=1600%) scale-out and about 35% degradation for a 50× scale-out. One of the main reasons for the degradation are stragglers caused by the very short barriers of SCD. The larger the data set, and consequently the more files, the higher the chance to hit a severe straggler. For instance, in the update prediction phase, the system orchestrates a thousand workers with 8000 cores and hundreds of thousands of work items in about six seconds. Thus, as a conclusion, SCD allows near linear scale-out to extremely large datasets.

The second gain from a distributed system is speed-up. That is, increasing the number of machines while the problem size stays the same. The speed-up of the system proposed above was studied on 20 billion training examples and the number of machines was varied from 1 to 128 workers. Again, each variant of the system was run for one epoch and the mean iteration time was reported. As SCD is robust, every configuration learned exactly the same model.

Figure 10:
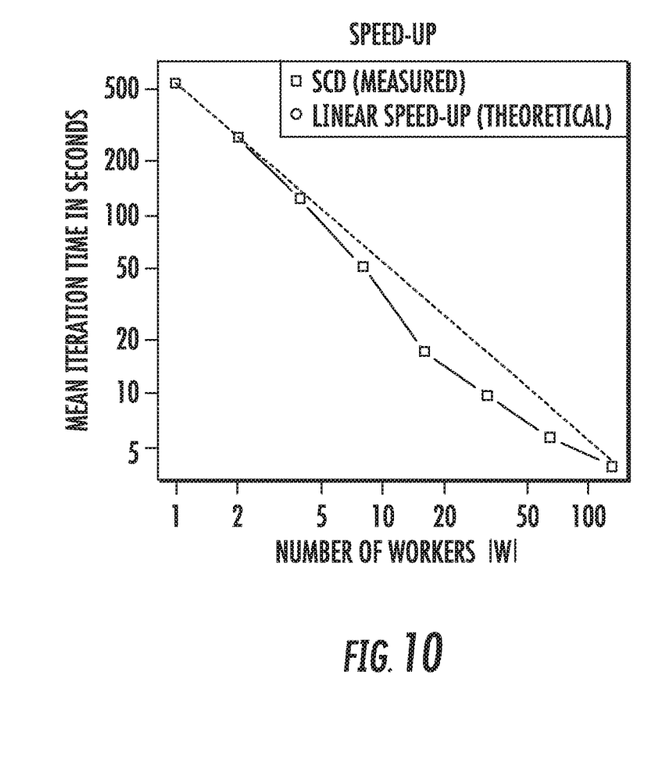
FIG. 10 depicts a graph of exemplary experimental results showing the speed up behavior of the scalable coordinate descent algorithm according to exemplary embodiments of the present disclosure.

The plot of FIG. 10 shows the average iteration time versus the number of workers. As can be seen, SCD provides a close to linear speed-up behavior. Actually, all configurations outperform the theoretical linear speed-up of a single worker. The reason for the super-linear speed-up is that the amount of data that can be cached increases with more workers. For instance, if one worker has 1 GB of memory for caching label data and there are 10 GB of label files, then with one worker at most 10% of the label requests are cache hits, whereas with 32 workers, overall 32 GB of labels can be cached, which results in a much higher cache hit rate.

Figure 11:
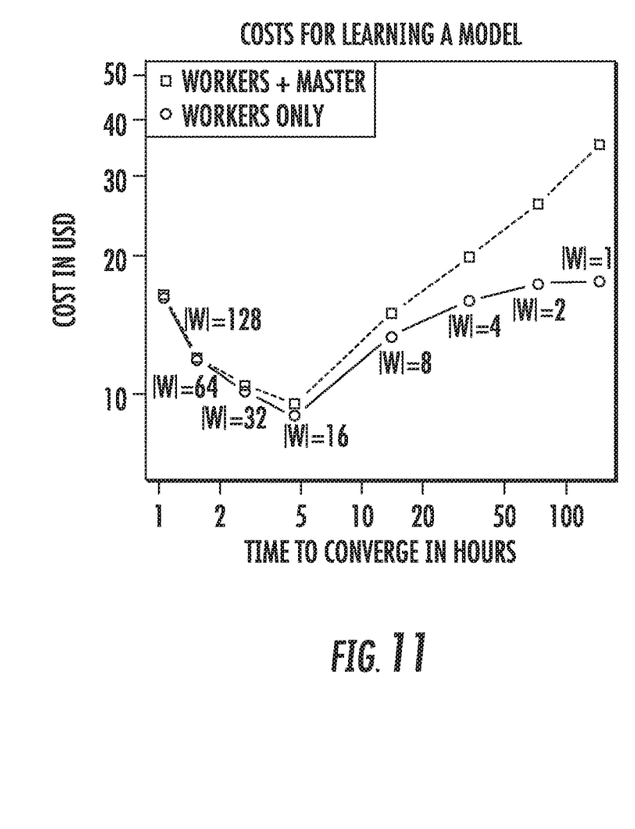
FIG. 11 depicts a graph of exemplary experimental results showing a time/cost trade-off of learning a model with a varying number of workers according to exemplary embodiments of the present disclosure.

In FIGS. 10 and 11, the super-linear speed-up has its optimum with 16 to 32 workers and moves closer to a linear speed-up with more workers. This is expected because more machines result in faster iterations, shorter barriers, and consequently, stronger straggler effects. For instance, having a straggler of 1 second might not have any effect on a run with 32 machines because barriers are every 3 seconds, whereas for 64 machines, where a perfect speed-up means 1.5 second barriers, the same straggler has more impact. More aggressive prefetching (e.g., two iterations ahead) may solve this tail latency issue.

Speeding-up a system implies getting the results faster when using more resources. If the cost for a resource is constant as in common cloud environments, a theoretical linear speed-up implies getting the result faster with exactly the same cost. However, in reality, speed-ups are not exactly linear and additional costs can occur.

In particular, the plot of FIG. 11 shows the time-vs-cost trade-off for speeding up the SCD algorithm. The number of resources was varied from 1 to 128 workers and the plot shows the time to converge (e.g., in this case running SCD for five epochs) versus the costs of the machines. For instance, running SCD for five epochs with 128 machines takes about one hour whereas the time with one worker is about 140 hours. The cost for running 128 workers for about one hour is about $16 whereas the cost for running one worker for 140 hours is about $17. Because SCD is robust, this means SCD can get the same model 100× faster with the same resource bill as a single machine.

Factoring in the cost for the master, running SCD with 128 workers is actually much cheaper. In particular, the same result is achieved 100× faster with 2× less cost. If cost alone should be minimized, the optimal choice would be using 16 workers which costs less than $10 and requires about five hours. Spending a dollar more and running with 32 machines, would give the results in 2.5 hours.

Besides the resource costs, learning models is also associated with other costs such as the time or salary of the end user who is waiting for the results, the number of experiments that can be explored, etc. That means reducing the runtime is usually much more valuable than the computation costs. Factoring in such other costs, the systems and methods described herein provide a substantial speed-up at marginally higher compute costs.

Finally, it is important to note that running very large datasets on low-priority cloud environments is very inexpensive. For instance, running the 20 billion example version of the advertising dataset to convergence would cost about $10 in the Google™ cloud. Given the value that such a model provides when it is applied, the costs are many orders of magnitude smaller.

Thus, the present disclosure provides a new scalable coordinate descent (SCD) algorithm for generalized linear models. SCD is highly robust, having the same convergence behavior regardless of how much it is scaled out and regardless of the computing environment. This allows SCD to scale to thousands of cores and makes it well suited for running in a cloud environment with low-cost commodity servers. On many real-world problems, SCD has the same convergence behavior as the popular single-machine coordinate descent (CD) algorithm.

In addition to the SCD algorithm, a distributed system is provided that addresses the specific challenges of scaling SCD in a cloud computing environment. Using Google's™ internal cloud, it was shown that SCD can provide near linear scaling using thousands of cores for 1 trillion training examples on a petabyte of compressed data.

Additional Disclosure

The technology discussed herein makes reference to servers, databases, software applications, and other computer-based systems, as well as actions taken by and information sent to and from such systems. The inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to various specific exemplary embodiments thereof, each exemplary embodiment is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations, and/or additions to the present subject matter as would be readily apparent to one of ordinary skill in the art. For instance, features illustrated or described as part of one embodiment or implementation can be used with another embodiment or implementation to yield a still further embodiment. Thus, the present disclosure includes such alterations, variations, and equivalents.

In addition, although FIG. 7 depicts steps performed in a particular order for purposes of illustration and discussion, the methods of the present disclosure are not limited to the particularly illustrated order or arrangement. The various steps illustrated in FIG. 7 can be omitted, rearranged, combined, and/or adapted in various ways without deviating from the scope of the present disclosure.

What is claimed is:

1. A computer-implemented method, comprising:
    obtaining, by one or more computing machines, a training dataset, the training dataset comprising a plurality of examples, each example comprising entries for a plurality of features;
    partitioning, by the one or more computing machines, the plurality of features into a plurality of blocks, wherein at least one of the plurality of blocks contains at least two features, and wherein, for each block, a respective feature subvector for each example has at most one non-zero entry;
    learning, by the one or more computing machines using at least some of the plurality of examples of the training dataset, a plurality of model parameters from the plurality of blocks, wherein learning the model parameters comprises performing, by the one or more computing machines, a plurality of iterations, and wherein performing the plurality of iterations comprises processing, by the one or more computing machines, only one of the plurality of blocks per iteration.

2. The computer-implemented method of claim 1, wherein:
    each of the plurality of features corresponds to one of a plurality of variables; and
    partitioning, by the one or more computing machines, the plurality of features into the plurality of blocks comprises partitioning, by the one or more computing machines, the plurality of features according to the plurality of variables, such that the number of blocks equals the number of variables, and such that each of the plurality of blocks includes the respective features that correspond to a respective one of the plurality of variables.

3. The computer-implemented method of claim 1, wherein:
    each of the plurality of features corresponds to one of a plurality of variables, the plurality of variables comprising one or more categorical variables and one or more set-valued variables; and
    partitioning, by the one or more computing machines, the plurality of features into the plurality of blocks comprises:
        for each of the one or more categorical variables, partitioning, by the one or more computing machines, the features that correspond to the one or more categorical variables according to the one or more categorical variables, such that each resulting block includes the respective features that correspond to a respective one of the one or more categorical variables; and
        for each of the one or more set-valued variables, partitioning, by the one or more computing machines, the features that correspond to the one or more set-valued variables into at least two blocks per set-valued variable, such that each resulting block includes, on average, one active feature per example.

4. The computer-implemented method of claim 1, wherein performing, by the one or more computing machines, the plurality of iterations comprises, at each iteration:

processing, by at least one of a plurality of distributed worker computing machines, a selected one of the plurality of blocks per iteration to determine sufficient statistics, wherein the selected block is selected by a master computing machine;

aggregating the sufficient statistics determined by at least one of the plurality of distributed worker computing machines;

updating the model parameters that correspond to the selected block based on the aggregated sufficient statistics; and updating a plurality of predictions respectively for the plurality of updated parameters.

5. The computer-implemented method of claim 1, wherein learning, by the one or more computing machines, the model parameters from the plurality of blocks further comprises:

sharding, by the one or more computing machines, the plurality of examples into a plurality of example shards; and at each iteration, respectively processing in parallel, by a plurality of worker computing machines, the plurality of example shards for one of the plurality of blocks.

6. A distributed computing system to perform large-scale machine learning, the system comprising:

a master computing machine that includes at least one processing device; and a plurality of worker computing machines under control of the master computing machine, wherein each worker computing machine includes at least one processing device;

wherein the system is configured to:

partition a plurality of features of a training dataset into a plurality of blocks, wherein the training dataset comprises a plurality of examples, wherein each example comprises entries for the plurality of features, wherein at least one of the plurality of blocks comprises at least two features, and wherein, for each block, a respective feature subvector for each example has at most one non-zero entry; and perform a plurality of iterations of a machine learning technique with respect to at least some of the plurality of examples of the training dataset to learn a plurality of parameters of a model from the plurality of blocks, and wherein the system is configured to process only one of the plurality of blocks per iteration.

7. The distributed computing system of claim 6, wherein to perform each iteration, the system is configured to:

select, by the master computing machine, one of the plurality of blocks;

determine, by the worker computing machines, sufficient statistics for the selected block;

aggregate the determined sufficient statistics;

update the parameters that correspond to the selected block based on the aggregated sufficient statistics; and update a plurality of predictions respectively for the plurality of updated parameters.

8. The distributed computing system of claim 7, wherein, at each iteration, the master computing machine selects the one of the plurality of blocks based on one or more heuristics that estimate which block will have the largest impact on convergence.

9. The distributed computing system of claim 7, wherein to perform each iteration, the system is further configured to:

determine, by the master computing machine, a step size after the sufficient statistics are aggregated but before the parameters of the model are updated.

10. The distributed computing system of claim 7, wherein to determine sufficient statistics for the selected block, the plurality of worker computing machines are configured to:

obtain respective shards of the plurality of examples for the selected block; and respectively determine sufficient statistics for the respective shards in parallel.

11. The distributed computing system of claim 10, wherein the master computing machine attempts to assign the same respective shard to each worker computing machine in each iteration so as to improve caching.

12. The distributed computing system of claim 10, wherein each worker computing machine is further configured to prefetch the respective shard for the next iteration so as to reduce the impact of tail latencies.

13. The distributed computing system of claim 7, wherein to determine sufficient statistics for the selected block, at least one of the plurality of worker computing machines is configured to:

obtain at least one of the respective shard, one or more labels for the respective shard, and one or more of the plurality of predictions for the respective shard from at least one of a first cache maintained in a first memory of such worker computing machine and a second cache maintained in a second memory of at least one other worker computing machine.

14. The distributed computing system of claim 7, wherein to aggregate the determined sufficient statistics, the system is configured to:

partition the determined sufficient statistics into a plurality of ranges;

assign, by the master computing machine, the plurality of ranges to respective ones of the plurality of worker computing machines;

fetch, by each worker computing machine to which one of the ranges was assigned, the sufficient statistics for the corresponding range from the other worker computing machines;

aggregate, by each worker computing machine to which one of the ranges was assigned, the sufficient statistics for the corresponding range; and transmit, by each worker computing machine to which one of the ranges was assigned, the aggregated sufficient statistics for the corresponding range to the master computing machine.

15. The distributed computing system of claim 7, wherein:

each worker computing machine is configured to implement a plurality of worker threads that execute work items in parallel; and each worker computing machine is configured to:

maintain at least a two-level memory store that comprises a single worker-level store and a plurality of thread-level stores respectively for the plurality of worker threads that such worker computing machine implements;

store at each thread-level store a first number of the sufficient statistics that correspond to the most frequently observed features; and store at the worker-level store a second number of the sufficient statistics that correspond to infrequently observed features and that are not stored at the thread-level stores;

wherein the two-level memory store enables lock-free updates of the sufficient statistics.

\* \* \* \* \*